United States Patent [19]

Kubitza et al.

[11] 4,305,977
[45] Dec. 15, 1981

[54] USE OF HYDROXYL ALKYL AMINES OPTIONALLY CONTAINING ETHER GROUPS OR THEIR SALTS AS ADDITIVES REDUCING RESISTANCE TO THE DIFFUSION OF WATER VAPOR IN POLYURETHANE-BASED COATING COMPOSITIONS

[75] Inventors: Werner Kubitza; Gerhard Mennicken, both of Leverkusen, Fed. Rep. of Germany

[73] Assignee: Bayer Aktiengesellschaft, Leverkusen, Fed. Rep. of Germany

[21] Appl. No.: 78,327

[22] Filed: Sep. 24, 1979

[30] Foreign Application Priority Data

Oct. 5, 1978 [DE] Fed. Rep. of Germany ....... 2843377

[51] Int. Cl.³ ............................................. B05D 5/00
[52] U.S. Cl. .............................. 427/245; 260/18 TN; 521/88; 521/94; 521/128; 521/905; 528/52; 528/53; 528/55; 528/75; 528/77; 528/904; 427/385.5; 427/393.6
[58] Field of Search ..................... 427/245, 246, 385.5, 427/372.2; 521/88, 94, 128, 905; 428/304, 316; 528/52, 53, 55, 75, 77, 904; 260/18 TN

[56] References Cited

U.S. PATENT DOCUMENTS 2,966,472 12/1960 Fiel ........................................ 260/18
3,245,827 4/1966 Weber, Jr. .
3,264,134 8/1966 Vill ...................................... 427/245
3,449,160 6/1969 Uznach et al. ...................... 427/245
3,582,396 6/1971 König et al. ......................... 427/245
3,622,527 11/1971 Dieterich et al. ............... 427/245 X
3,726,838 4/1973 Eimer et al. .
3,781,238 12/1973 Helm ........................... 260/29.2 TN
3,788,887 1/1974 Traubel et al. ...................... 427/245
3,792,023 2/1974 Havenith et al. ........... 260/77.5 AO

FOREIGN PATENT DOCUMENTS 816093 7/1959 United Kingdom ............. 528/52 X

OTHER PUBLICATIONS

Klopfer: Wassertransport durch Diffusion in Feststoffen, pp. 115–122, Bauverlag GmbH, Wiesbaden and Berlin (1975).

Primary Examiner—Ronald H. Smith
Assistant Examiner—Thurman K. Page
Attorney, Agent, or Firm—Gene Harsh; Lawrence S. Pope; Thomas W. Roy

[57] ABSTRACT

A process for improving the water vapor permeability of polyurethane coatings by incorporating a hydroxy alkyl amine, an alkoxylated amine or the salt of either with an inorganic or organic acid into the coating composition is taught. Coating compositions including this water vapor diffusion enhancing additive are also taught as is a process for coating water vapor permeable substrates.

7 Claims, No Drawings

USE OF HYDROXYL ALKYL AMINES OPTIONALLY CONTAINING ETHER GROUPS OR THEIR SALTS AS ADDITIVES REDUCING RESISTANCE TO THE DIFFUSION OF WATER VAPOR IN POLYURETHANE-BASED COATING COMPOSITIONS

BACKGROUND OF THE INVENTION

Dispersion paints based on polyvinyl acetate, polyvinyl propionate, styrene-butadiene or acrylate-styrene or even solvent-containing paints based on acrylate copolymers are used for painting the surfaces of mineral building materials, particularly when they are used for facades.

The disadvantage of dispersion coatings is that they become soiled relatively quickly and, in many cases, also chalk rapidly, thus resulting in degradation of the paint film.

Paints based on the above-mentioned dispersions and the solvent-containing copolymers have the disadvantage of being poorly resistant to chemicals, particularly solvents. This is an obstacle inter alia in the removal of dirt from walls using aggressive cleaning agents and organic solvents. For these reasons, polyurethane systems have for several years been used to a limited extent for painting facades. The main advantages of polyurethane systems are their high weather resistance, their good surface smoothness, their minimal tendency towards soiling, their high resistance to chemicals and the fact that they are easy to clean.

Light-stable, aliphatic polyurethane paints, however, have the disadvantage of being relatively highly resistant to the diffusion of water vapor ($\mu$-factor according to DIN 52 615), with the result that they cannot be used for every type of wall construction (Klopfer: Wassertransport durch Diffusion in Feststoffen, pages 115-122, Bauverlag GmbH, Wiesbaden and Berlin (1975)).

Accordingly, the object of the present invention is to provide polyurethane formulations which show a considerable improvement over conventional polyurethane paints in their permeability to water vapor, so that the paint systems may also be used for coating substrates and wall constructions of the type required to show extremely low resistance to diffusion without the known advantageous properties of polyurethane-based coating compositions or of the coatings produced from them being adversely affected as a result.

Surprisingly, this object may be achieved by using the additives described in more detail hereinafter in dissolved form.

SUMMARY OF THE INVENTION

The present invention relates to the use of hydroxyl alkyl amines optionally containing ether groups and having a molecular weight in the range of from about 61 to 2,000 or their salts with inorganic or organic acids as additives which reduce resistance to the diffusion of water vapor in one- or two-component polyurethane-based coating compositions.

Preferred additives according to the present invention include:

1. hydroxyl alkyl amines having a molecular weight in the range of from about 61 to 300 and corresponding to the following general formula:

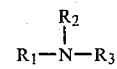

wherein
$R_1$ represents hydrogen, a $C_1$–$C_4$ alkyl radical or a $C_2$–$C_4$ hydroxy alkyl radical, in which case at least 2 carbon atoms are situated between the hydroxyl group and the nitrogen atom,
$R_2$ represents hydrogen or a $C_2$–$C_4$ hydroxy alkyl group, in which case at least 2 carbon atoms are situated between the hydroxyl group and the nitrogen atom, and
$R_3$ represents a $C_2$–$C_4$ hydroxy alkyl group having at least 2 carbon atoms situated between the oxygen atom and the nitrogen atom, or their salts with inorganic or organic acids of the type mentioned by way of example hereinafter; and in particular 2. salts of hydroxy alkyl amines containing ether groups and having a molecular weight in the range of from about 163 to 2,000, preferably from about 1,000 to 1,500, of the type obtainable using a known method by alkoxylating starter molecules containing at least one =N—H group and preferably at least 2 hydrogen atoms bound to nitrogen, with inorganic or organic acids of the type mentioned by way of example hereinafter.

DETAILED DESCRIPTION OF THE INVENTION

Suitable hydroxy alkyl amines corresponding to the above formula are, for example, ethanolamine, diethanolamine, triethanolamine, 2-hydroxypropyl amine, bis-(2-hydroxypropyl)-amine, N-methyl diethanolamine or N-ethyl-di-(2-hydroxypropyl)-amine.

Suitable hydroxy alkyl amines containing ether groups are, in particular, the addition products known per se of ethylene oxide and/or propylene oxide with amines containing at least 1 =N—H—group and preferably at least 2 hydrogen atoms bound to nitrogen, alkoxylation leading beyond the above-mentioned hydroxy alkyl amines to hydroxy alkyl amines containing ether groups. Suitable starter molecules are, for example, ammonia, methyl amine, ethylene diamine, hexamethyl diamine or even the above-mentioned amino alcohols which do not contain any ether groups and which in turn are formed as an intermediate stage in the alkoxylation of the monoamines just mentioned.

The amino alcohols mentioned in 1 are used either as such or in the form of salts while the amino polyethers mentioned in 2 are preferably used in the form of salts with inorganic or organic acids. Acids suitable for salt formation are any inorganic or organic acids preferably having a pK value of more than about 2 and, in particular, more than about 4, such as phosphoric acid, acetic acid, benzoic acid, butyric acid, hexanecarboxylic acid or 2-ethyl hexanoic acid. In general it can be said that those acids which correspond to above pK values and whose salts with the hydroxy alkyl amines are soluble in the coating compositions are particularly preferred. Such acids are i.e. benzoic acid or 2-ethyl hexanoic acid. Inorganic acids such as sulphuric acid or hydrochloric acid or Lewis acids such as aluminum chloride are suitable but less preferred.

The additives according to the present invention are added to the one- or two-component polyurethane systems in quantities of from about 1 to 20% by weight, preferably in quantities of from about 5 to 10% by weight, based on the binder content of the final polyurethane composition.

The additives according to the present invention may be used in any polyurethane-based coating compositions. They are suitable both for solvent-free and for solvent-containing polyurethane coating systems which contain as binders NCO prepolymers crosslinkable with atmospheric moisture (one-component systems) or mixtures of organic polyisocyanates and compounds containing isocyanate-reactive hydrogen atoms (two-component systems). Polyurethane lacquers or coating compositions of this type are known and are described in detail in the literature (cf. for example, Kunststoff-Handbuch, Volume VII, "Polyurethane", Carl Hanser Verlag, Munich (1966), pages 21 et seq; British Pat. No. 1,411,434, German Auslegeschrift No. 1,494,465, German Offenlegungsschrift No. 1,225,274, German Auslegeschrift No. 2,304,893, German Offenlegungsschrift No. 2,313,004, U.S. Pat. No. 3,267,078, incorporated herein by reference, U.S. Pat. No. 3,351,573, incorporated herein by reference, or German Auslegeschrift No. 1,931,053). The coating compositions to be modified in accordance with the present invention are preferably coating compositions based on polyisocyanates containing aliphatically, cycloaliphatically or araliphatically bound isocyanate groups. It is also possible, however, to use coating compositions based on polyisocyanates containing aromatically bound isocyanate groups. Reactants for the polyisocyanates either in the production of the NCO prepolymers or in the above-mentioned two-component systems are preferably the polyester polyols, polyether polyols or polyhydroxy polyacrylates commonly encountered in polyurethane lacquer technology. Epoxide resins may also be used, particularly in two-component systems.

When the additives according to the present invention are used in accordance with the invention, it is necessary, in calculating the quantitative ratios between the binder components, to take into account the fact that the additives used in accordance with the invention also contain isocyanate-reactive hydrogen atoms. This means that, in one-component systems, an excess of NCO groups must always be present in relation to the isocyanate-reactive groups of the additives while in two-component systems the quantity in which the polyisocyanate component is present has to be increased accordingly where high concentrations of isocyanate-reactive groups emanating from the additives are present.

In addition to the additives according to the present invention, the coating compositions may contain the conventional auxiliaries and additives of the type described, for example, in the above-mentioned literature references.

The coating compositions modified in accordance with the present invention are particularly suitable for the production of coatings required to show high permeability to water vapor on the surfaces of mineral building materials. The coating compositions are especially suitable for coating mineral substrates as i.e. concrete, plaster, asbestos cement, sand stone or glass fibre reinforced concrete or similar materials which are used in the building industry. If exterior building surfaces of such materials particularly masonry surfaces are coated with the coating compositions of the invention they are preferably used in such quantities which correspond to a quantity of about 150 to about 250 g/m² based on solid components of the coating composition. It is, of course, also possible to apply the compositions of the invention on other surfaces such as i.e. wood, leather or plastics.

The present invention is illustrated by the following Examples in which all the percentages quoted represent % by weight.

The following additives according to the present invention were used in the following Examples:

Additive A

Benzoic acid salt of an ethoxylation product of ammonia; molecular weight of the product: approximately 1,300.

Additive B

Propoxylation product of methyl amine; molecular weight: approximately 1,200.

Additive C

Triethanolamine.

The following starting materials were used for the production of the coating compositions:

Polyisocyanate 1

A biuret-polyisocyanate mixture consisting essentially of tris-(isocyanatohexyl)-biuret, obtained by biuretizing hexamethylene diisocyanate. The NCO content of the product in the form of a 75% solution in ethylene glycol monoethyl ether acetate amounts to approximately 16.5%.

Polyisocyanate 2

An aromatic urethane-polyisocyanate containing free NCO groups, obtained by reacting 3 mols of tolylene diisocyanate with 1 mol of trimethylol propane. The NCO content of a 75% solution in ethyl acetate amounts to approximately 13%.

Polyisocyanate 3

An aliphatic urethane polyisocyanate which contains free NCO groups and which hardens under the effect of atmospheric moisture, consisting essentially of the reaction product of a tris-(isocyanatohexyl)-biuret with a saturated phthalic acid/trimethylol propane polyester containing 2% OH. The NCO content of a 60% solution in ethylene glycol monoethyl ether acetate/xylene (1:1) amounts to approximately 9.5%.

Polyalcohol I

A saturated polyester of phthalic acid and trimethylol propane containing approximately 8% of free hydroxyl groups.

Polyalcohol II

A hydroxy-functional polyacrylate resin obtained by copolymerizing butyl acrylate, 2-hydroxy propyl methacrylate and monostyrene. The solid resin has an OH content of approximately 2.7%.

Polyalcohol III

A saturated polyester containing 4% of hydroxyl groups and modified with 25% of saturated fatty acid, but otherwise consisting of approximately 40% of trimethylol propane and approximately 35% of phthalic acid.

Polyalcohol IV

Polypropylene glycol having a hydroxyl content of approximately 3.5%.

Polyalcohol V

A saturated polyester containing approximately 8.8% of free hydroxyl groups obtained from a mixture of phthalic acid and adipic acid esterified with trimethylol propane.

Coating compositions according to Examples 1 to 7 below were applied by spraying to flat polyethylene sheets in such a way that they produced an average dry film thickness of approximately 0.11 mm. After drying for 4 weeks at room temperature, the films were mechanically removed from the substrate and their resistance to the diffusion of water vapor ($\mu$-factor) was determined in accordance with DIN 52 615.

EXAMPLES

EXAMPLE 1

A polyurethane film obtained from the following coating composition:
  Polyalcohol I: 100 parts by weight
  Pigment (titanium dioxide, rutile): 152 parts by weight
  Levelling agent (polyacrylate resin or cellulose acetobutyrate): 1 part by weight
  Accelerator (zinc octoate): 0.4 part by weight
  Solvent: ethylene glycol monoethyl ether acetate: 102 parts by weight
  Polyisocyanate 1: 120 parts by weight
has a resistance to the diffusion of water vapor ($\mu$-factor), as measured in accordance with DIN 52 615, of approximately 55,000. The addition of 9.5 parts by weight of additive A reduces the $\mu$-factor to approximately 25,000. The addition of 19 parts by weight produced the following results:

|  | No addition | With 10% of additive A |
|---|---|---|
| $\mu$-factor | 55,000 | 12,000 |
| Dust-dry after | 8 hours | 7 hours |
| Erichsen value | 9 mm (crack formation) | 9 mm (crack formation) |

EXAMPLE 2

A polyurethane film obtained from the following coating composition:
  Polyalcohol II: 100 parts by weight
  Pigment (titanium dioxide, rutile): 65 parts by weight
  Levelling agent: cellulose acetobutyrate: 0.65 part by weight
  Solvent: ethylene glycol monoethyl ether acetate: 120 parts by weight
  Polyisocyanate 1: 40 parts by weight
has a resistance to the diffusion of water vapor ($\mu$-factor of approximately 23,000. The addition of 13 parts by weight of additive A reduces the $\mu$-factor to approximately 11,000. The drying times of the coating and its resistance to solvents remain unaffected. The Erichsen value is also above the crack formation point, i.e. 9.0 mm.

The same behavior was observed in the case of hydroxy-functional polyacrylate resins having OH-contents of 3.5% and 4.1%.

EXAMPLE 3

A polyurethane film obtained from the following coating composition:
  Polyalcohol III: 100 parts by weight
  Pigment (titanium dioxide, rutile): 80 parts by weight
  Levelling agent: cellulose acetobutyrate: 0.8 part by weight
  Accelerator: zinc octoate: 0.3 part by weight
  Solvent: ethylene glycol monoethyl ether acetate: 135 parts by weight
  Polyisocyanate 1: 75 parts by weight
has a resistance to the diffusion of water vapor ($\mu$-factor) of approximately 45,000. The addition of 15.6 parts by weight of additive A reduces the $\mu$-factor to approximately 15,000. The drying time of approximately 8 hours remains unchanged. Similarly, the characteristic solvent resistance of the films is obtained after drying for 14 days both with, and also without, additive A. In both cases, the Erichsen value of the films is above the crack formation point.

EXAMPLE 4

A polyurethane film obtained from the following coating composition:
  Polyalcohol V: 100 parts by weight
  Pigment (titanium dioxide, rutile): 112.5 parts by weight
  Levelling agent: cellulose acetobutyrate: 1.2 parts by weight
  Solvent: ethylene glycol monoethyl ether acetate: 181 parts by weight
  Polyisocyanate 2: 168 parts by weight
has a $\mu$-factor of approximately 35,000. The addition of 22.5 parts by weight of additive A reduces the $\mu$-factor to approximately 18,000. The films applied are dust-dry after about 4 hours both before and after the addition, although the characteristic solvent resistance is obtained after drying for only 3 days as opposed to 6 days.

EXAMPLE 5

A polyurethane film obtained from the following coating composition:
  Polyalcohol IV: 100 parts by weight
  Vinyl copolymer: 50 parts by weight
  Pigment (titanium dioxide, rutile): 340 parts by weight
  Filler: barium sulphate: 422 parts by weight
  Solvent: ethylene glycol monoethyl ether acetate: 571 parts by weight
  Polyisocyanate 2: 205 parts by weight
has a $\mu$-factor of approximately 25,000. The addition of 25.3 parts by weight of additive A reduces the $\mu$-factor to approximately 5,000. The films are dust-dry after 1 hour as opposed to 2 hours while their characteristic solvent resistance is obtained after drying for only 6 days as opposed to 14 days. The elasticity of this relatively hard film intended as a primer is measurably improved. Thus, the Erichsen values increase from 1.5 mm to approximately 4 mm.

EXAMPLE 6

A polyurethane film obtained from the following coating composition:
  Polyalcohol I: 100 parts by weight
  Pigment (titanium dioxide, rutile): 152 parts by weight
  Levelling agent: cellulose acetobutyrate: 1 part by weight
  Accelerator: zinc octoate: 0.4 part by weight
  Solvent: ethylene glycol monoethyl ether acetate: 102 parts by weight
  Polyisocyanate 1: 120 parts by weight
has a $\mu$-factor of approximately 55,000. The addition of 9.5 parts by weight of additive B or C reduces the $\mu$-factor to approximately 20,000. The drying time (to the dust-dry state) is slightly reduced from 8 to 7 hours, while the characteristic solvent resistance is obtained after drying for 2 days in either case.

EXAMPLE 7

A polyurethane film obtained from the following coating composition:
 Polyisocyanate 3: 100 parts by weight
 Pigment (titanium dioxide, rutile): 30 parts by weight
 Levelling agent: polyacrylate resin: 0.03 part by weight
 Accelerator: dibutyl tin dilaurate: 0.06 part by weight
 Drying agent for pigment: tolyl sulphonyl monoisocyanate: 3.75 parts by weight
 Solvent: ethylene glycol monoethyl ether acetate: 16 parts by weight and hardened by the action of atmospheric moisture has a $\mu$-factor of approximately 45,000. The addition of 6 parts by weight of additive A reduces the $\mu$-factor to approximately 17,000. The drying time (to the dust-dry state) is reduced from 8 to 5 hours and the films have their characteristic solvent resistance after only 3 days as opposed to 14 days. The Erichsen value of the films remains unchanged above the crack formation point.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for coating a substrate with a polyurethane-based lacquer by depositing on the substrate either NCO-terminated prepolymers cross-linkable with atmospheric moisture or mixtures of organic polyisocyanates and compounds containing isocyanate-reactive hydrogen atoms, the improvement comprising improving the diffusion of water vapor through the cured coating so obtained by including an additive selected from the group consisting of salts of hydroxy alkyl amines and salts of alkoxylated amines, said salts being formed with inorganic or organic acids having a pK value of at least 2 and said amines having a molecular weight between about 61 and 2,000.

2. In the process of claim 1, the further improvement wherein the amine from which the salt additive is formed has a molecular weight of between about 61 and 300 and has the general formula:

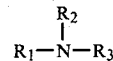

wherein
 $R_1$ is H, a $C_{1-4}$ alkyl radical or a $C_{2-4}$ hydroxy alkyl radical in which at least 2 carbon atoms separate the hydroxyl group from the bond with the nitrogen atom,
 $R_2$ is H or a $C_{2-4}$ hydroxy alkyl radical in which at least 2 carbon atoms separate the bond with the nitrogen atom from the hydroxyl groups, and
 $R_3$ is a $C_{2-4}$ hydroxy alkyl radical in which at least 2 carbon atoms separate the hydroxyl group from te bond with the nitrogen atom.

3. In the process of claim 1, the further improvement wherein the additive is the salt of an organic or inorganic acid having a pK of at least about 2 and an alkoxylated amine having a molecular weight of between about 163 and 2,000 and being based upon either an amine with at least one primary or secondary amino group or ammonia.

4. In the process of claim 3, the further improvement wherein said additive is a salt of 2-ethyl hexanoic acid or benzoic acid.

5. In the process of claim 1, the further improvement wherein the coating composition contains between about 5 and 10 wt. %, based on the weight of polyurethane forming reactants, of said additive.

6. A process for coating a water vapor permeable substrate with a polyurethane lacquer having improved water vapor permeability comprising applying to said substrate a composition including polyurethane-forming reactants and between 1 and 20 wt. %, based on the weight of the polyurethane-forming reactants, of an additive selected from the group consisting of salts of (I) amines having molecular weights between about 61 and 2,000 selected from the group consisting of hydroxy alkyl amines and alkoxylated amines with (II) inorganic or organic acids having a pK of at least about 2, and allowing said reactants to form a polyurethane coating.

7. A polyurethane coating composition suitable for the production of coatings having improved water vapor permeability comprising isocyanate bearing reactants and between 1 and 20 wt. %, based on the total weight of polyurethane reactants, of an additive selected from the group consisting of salts of (I) amines having molecular weights of between 61 and 2,000 selected from the group consisting of hydroxy alkyl amines and alkoxylated amines with (II) inorganic or organic acids having a pK of at least about 2.

* * * * *